(12) United States Patent
Zhang

(10) Patent No.: US 12,058,281 B2
(45) Date of Patent: Aug. 6, 2024

(54) MOBILE TERMINAL ASSEMBLY AND MOBILE TERMINAL

(71) Applicant: ZTE Corporation, Shenzhen (CN)

(72) Inventor: Yongliang Zhang, Shenzhen (CN)

(73) Assignee: Xi'An Zhongxing New Software Co., Ltd., Xi-An (CN)

( * ) Notice: Subject to any disclaimer, the term of this patent is extended or adjusted under 35 U.S.C. 154(b) by 70 days.

(21) Appl. No.: 17/925,391

(22) PCT Filed: May 26, 2021

(86) PCT No.: PCT/CN2021/096056
§ 371 (c)(1),
(2) Date: Nov. 15, 2022

(87) PCT Pub. No.: WO2022/001513
PCT Pub. Date: Jan. 6, 2022

(65) Prior Publication Data
US 2023/0188632 A1 Jun. 15, 2023

(30) Foreign Application Priority Data
Jun. 29, 2020 (CN) .......................... 202010605983.7

(51) Int. Cl.
*H04M 1/02* (2006.01)
*H04B 1/3818* (2015.01)

(52) U.S. Cl.
CPC ........ *H04M 1/0274* (2013.01); *H04B 1/3818* (2015.01)

(58) Field of Classification Search
CPC .......................... H04M 1/0274; H04B 1/3818
See application file for complete search history.

(56) References Cited

U.S. PATENT DOCUMENTS

2009/0108063 A1* 4/2009 Jain .................... G06K 7/10237
235/492
2010/0264211 A1* 10/2010 Jain .................... H04W 12/062
235/380

(Continued)

FOREIGN PATENT DOCUMENTS

CN          200944430 Y     9/2007
CN          101437059 A     5/2009

(Continued)

OTHER PUBLICATIONS

International Search Report and Written Opinion for International Application No. PCT/CN2021/096056, mailed Aug. 24, 2021.

*Primary Examiner* — Junpeng Chen
(74) *Attorney, Agent, or Firm* — Wolf, Greenfield & Sacks, P.C.

(57) ABSTRACT

A mobile terminal assembly and a mobile terminal are disclosed. The mobile terminal assembly may include a housing, a card holder assembly and a first antenna module. The housing is provided with a card slot; the card holder assembly is located at the card slot and is configured to carry a memory; and the first antenna module is installed in the housing. The first antenna module is configured to be switched between a first position and a second position under the action of an external force. When the first antenna module is located at the first position, the card holder assembly is located in the housing, and the first antenna module is located between the card holder assembly and the card slot; and when the first antenna module is located at the second position, the holder assembly at least partially passes through the card slot to extend outside the housing.

20 Claims, 13 Drawing Sheets

(56) References Cited

U.S. PATENT DOCUMENTS

2011/0063779 A1* 3/2011 Ochi .................... H04B 1/3816
                                                                               361/679.01
2011/0312382 A1 12/2011 Itay et al.

FOREIGN PATENT DOCUMENTS

| CN | 105071848 A | 11/2015 |
|---|---|---|
| CN | 111029735 A | 4/2020 |

* cited by examiner

MOBILE TERMINAL ASSEMBLY AND MOBILE TERMINAL

CROSS-REFERENCE TO RELATED APPLICATION

The present disclosure is a national stage filing under 35 U.S.C. § 371 of international application number PCT/CN2021/096056, filed May 26, 2021, which claims priority to Chinese patent application No. 202010605983.7 filed Jun. 29, 2020. The contents of these applications are incorporated herein by reference in their entirety.

TECHNICAL FIELD

The present disclosure relates to the field of electronic equipment, and in particular to a mobile terminal assembly and a mobile terminal.

BACKGROUND

With the popularization of 5G technology, there are more and more mobile terminal assemblies adopting 5G technology. The 5G mobile terminal assemblies adopt millimeter wave antennas or Sub 6 GHz MIMO antennas. Due to the characteristics of the wavelength and frequency of 5G signals and the fact that 5G mobile terminal assemblies need to reserve multiple positions for antennas of other frequencies, such as 2G/3G/4G antennas, the antenna space inside 5G mobile terminal assemblies will be insufficient.

SUMMARY

In accordance with an aspect of the present disclosure, an embodiment provides a mobile terminal assembly configured for a mobile terminal. The mobile terminal assembly may include a housing with a card slot; a card holder assembly located at the card slot and configured for insertion of a memory; and a first antenna module arranged in the housing. The first antenna module is configured to be switched between a first position and a second position under the action of an external force. When the first antenna module is located at the first position, the card holder assembly is located in the housing, and the first antenna module is located between the card holder assembly and the card slot. When the first antenna module is located at the second position, the card holder assembly at least partially passes through the card slot to extend outside the housing.

In accordance with another aspect of the present disclosure, an embodiment provides a mobile terminal including the mobile terminal assembly as described above.

REFERENCE NUMERALS

Figure 1:
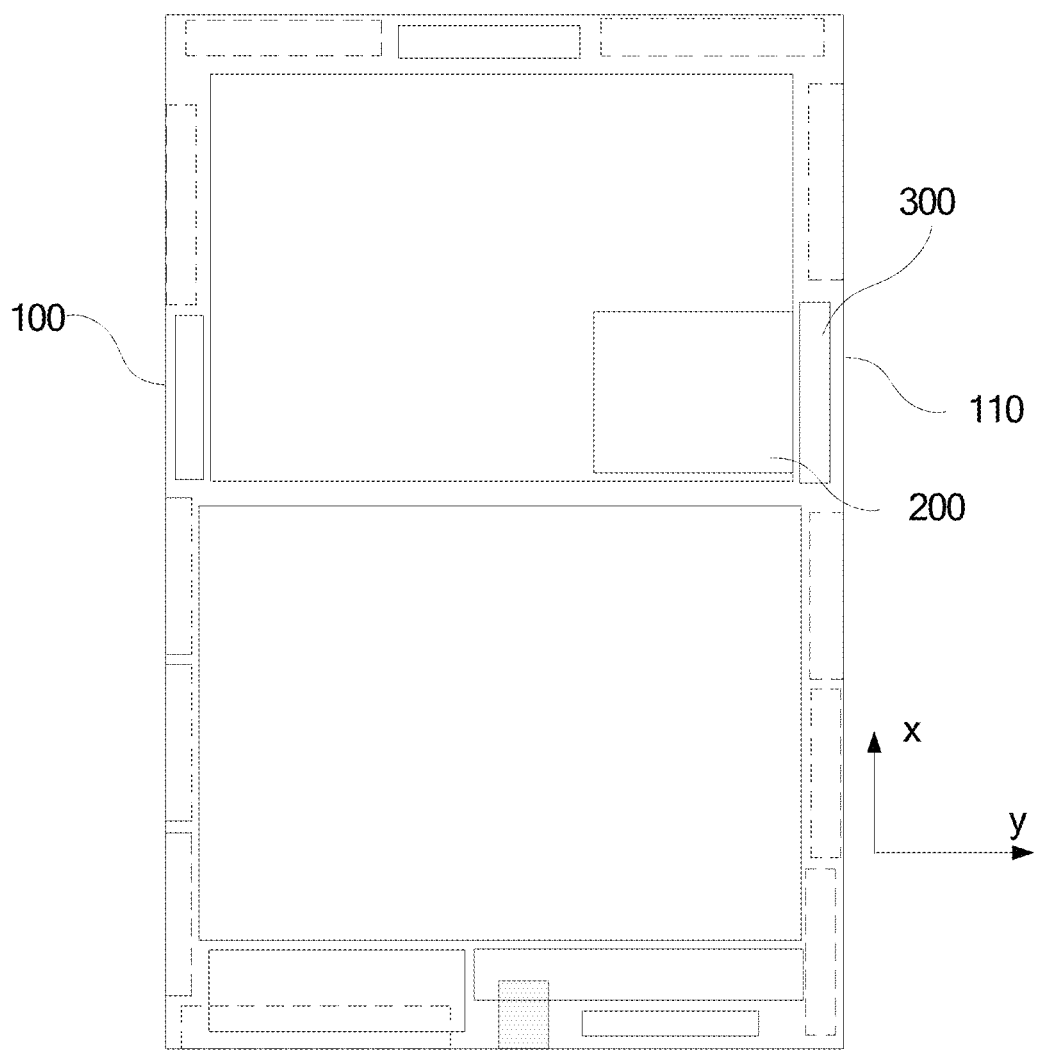
FIG. 1 is a schematic structural diagram of a mobile terminal provided by an embodiment of the present disclosure.
Figure 2:
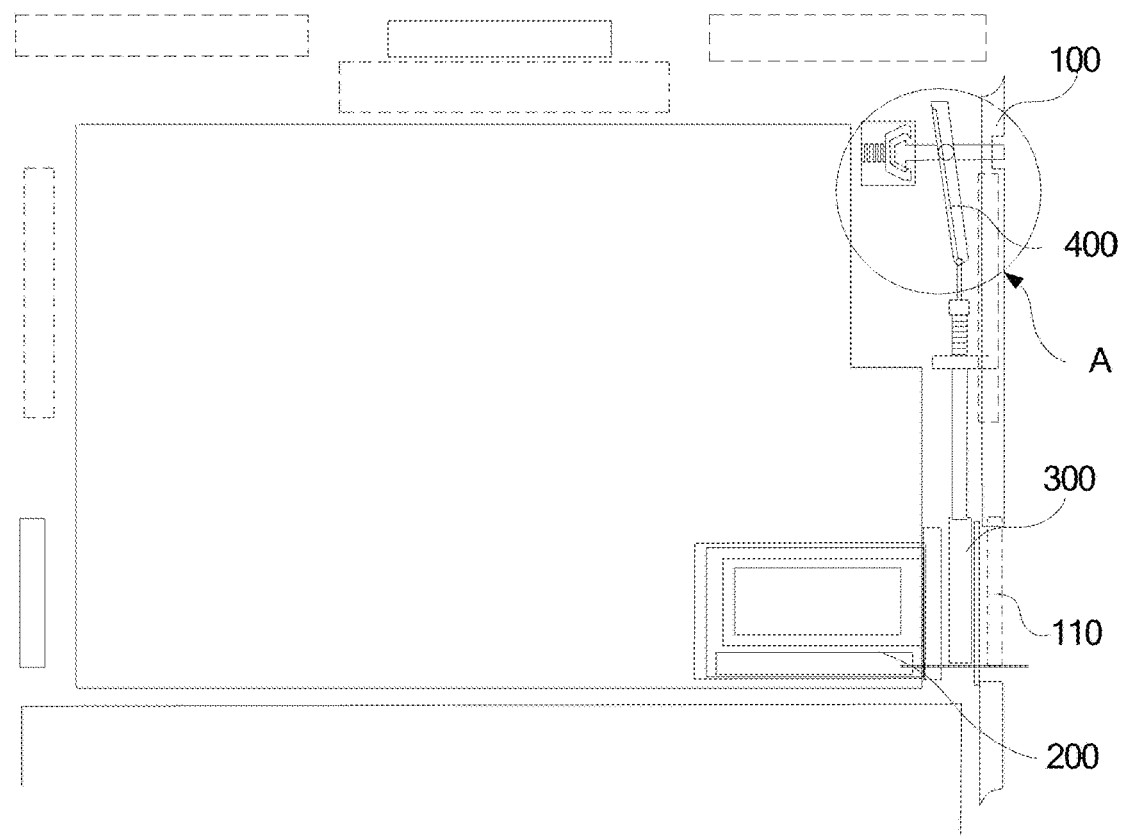
FIG. 2 is a schematic structural diagram of a mobile terminal assembly provided by an embodiment of the present disclosure, with a first antenna module being located at a first position.

10. mobile terminal;
101. processor; 102. driver; 103. PWM generator; 104. driving power supply; 105. voltage division circuit; 106. photoelectric detection circuit;
100. housing; 110. card slot;
200. card holder assembly; 210. card holder; 220. first card support; 230. second card support; 240. self-locking mechanism;
300. first antenna module;
400. transmission assembly; 410. button; 420. sliding rail; 421. sliding groove; 422. fixing groove; 430. rolling bead; 440. first power source; 450. first transmission device; 451. transmission mechanism; 452. connecting rod; 453. first pulley; 454. first traction rope; 460. second power source; 470. second transmission device; 471. bracket; 4711. first bearing; 4712. second bearing; 472. threaded rod; 473. support rod; 480. third transmission device; 481. driving wheel; 482. driven wheel; 483. second pulley; 484. second traction rope; 485. connecting mechanism;
500. movable assembly; 510. structured light assembly;
600. memory;
700. ejector pin.

DETAILED DESCRIPTION

The technical schemes in embodiments of the present disclosure will be described below in combination with the drawings in the embodiments of the present disclosure. Apparently, the described embodiments are merely some of the embodiments of the present disclosure, not all of the embodiments. Based on the embodiments of the present disclosure, all other embodiments obtained by those having ordinary skills in the art without creative effort will fall within the protection scope of the present disclosure.

It should be understood in the description of the present invention that terms such as "central", "longitudinal", "transverse", "length", "width", "thickness", "upper", "lower", "front", "back", "left", "right", "vertical", "horizontal", "top", "bottom", "inner", "outer", "clockwise", "counterclockwise", and the like indicate directional or positional relationships shown based on the drawings, and are only intended to facilitate the description of the present disclosure and the simplification of the description, rather than to indicate or imply that the indicated device or element must have a specific direction or constructed and operated in a specific direction, and therefore, shall not be understood as a limitation to the present disclosure. In addition, the terms "first" and "second" are only used for the purpose of description, and are not intended to be understood as indicating or implying relative importance or implicitly indicating the number of indicated technical features. Therefore, the features defined by "first" and "second" may explicitly or implicitly include one or more features. In the description of the present disclosure, "a plurality of" means two or more, unless otherwise specifically defined.

The inventor of the present disclosure found during research that a 5G network mainly utilizes two frequency bands: FR1 frequency band and FR2 frequency band. The FR1 frequency band has a range of 450 MHz to 6 GHz, also known as sub 6 GHz frequency band; while the FR2 frequency band has a range of 24.25 GHz to 52.6 GHz, commonly called millimeter wave (mm Wave). Typically, a single 5G antenna module has a size of 19 mm×5 mm×1.8 mm or 21 mm×3.5 mm×0.6 mm.

At present, a mobile terminal basically does not take out an SIM card from a back opening due to many aspects such as water proofing, modeling, adding of Near Field Communication (NFC) function, user experience, etc. Meanwhile, the full popularization of an eSIM (a virtual SIM card embedded in a chip-on-board) still takes time. Similarly, not all mobile terminals are equipped with large-capacity memories and have cancelled SD cards used for expanding memories, so SD cards may continue to be used in mobile terminals. Therefore, in order to solve the problem of a conflict between the position of a side millimeter wave antenna module or sub 6 GHz antenna structure module and the position of an SIM card slot opening under the condition of tight layout, an embodiment of the present disclosure proposes a scheme that the millimeter wave antenna module or sub 6 GHz antenna structure module is directly placed at a position between an SIM card holder or an SIM card support and an SIM card slot, and can be removed according to user needs to facilitate a user to take out/place an SIM card.

At present, a general SIM card slot has a length of 20 mm, which is approximately consistent with a typical length (19 mm-21 mm) of a millimeter wave antenna module. An outer edge side of the SIM card slot is also suitable for antenna wiring of two frequency bands of the Sub 6 GHz. Therefore, under condition of tight layout inside a 5G mobile terminal, it is possible to place the millimeter wave antenna module and sub 6 GHz antenna structure module at the position of the SIM card slot. In this case, because the millimeter wave antenna module or sub 6 GHz antenna structure module at this position blocks the SIM card holder placed inside, the user needs to remove the millimeter wave antenna module or sub 6 GHz antenna structure module when he/she needs to take out/place the SIM card. As it is not a regular behavior for the user to take out/place the SIM card, the above scheme allows the user to remove the millimeter wave antenna module or sub 6 GHz antenna structure module when taking out/placing the SIM card and move the millimeter wave antenna module or sub 6 GHz antenna structure module back after the SIM card is taken out/placed, which can not only alleviate the problem of tight antenna layout of the 5G mobile terminal, but also not cause substantial influence on the use by users.

Some implementations of the present disclosure will be described below in detail in conjunction with the drawings. The following embodiments and the features in the embodiments may be combined to derive other embodiments not explicitly described.

In accordance with an aspect of the present disclosure, an embodiment provides a mobile terminal assembly, which is applied in a mobile terminal 10. Referring to FIG. 1, the mobile terminal assembly includes a housing 100, a card holder assembly 200 and a first antenna module 300. The housing 100 is provided with a card slot 110. The card holder assembly 200 is located at the card slot 110, and is configured to carry a memory 600 (not shown). The first antenna module 300 is installed in the housing 100. The first antenna module 300 may be switched between a first position and a second position under the action of an external force. When the first antenna module 300 is located at the first position, the card holder assembly 200 is located in the housing 100, and the first antenna module 300 is located between the card holder assembly 200 and the card slot 110. When the first antenna module 300 is located at the second position, a card holder 210 at least partially passes through the card slot 110 to extend out of the housing 100. It can be understood that the mobile terminal assembly includes a 5G antenna assembly including a first antenna module 300. In an embodiment, the mobile terminal assembly further includes one or more of a 2G antenna assembly, a 3G antenna assembly and a 4G antenna assembly to meet the requirements of the mobile terminal assembly for receiving/transmitting signals with different frequencies. It can be understood that the memory 600 includes at least one of an SIM card, an SD card, or an SIM/SD combination card.

With the above technical scheme, the first antenna module 300 is designed to be capable of being switched between the first position and the second position, so that the internal space of the mobile terminal 10 can be fully utilized. When the first antenna module 300 is located at the first position, the card holder assembly 200 is located in the housing 100, and the first antenna module 300 is located between the card holder assembly 200 and the card slot 110, so that the space infrequently used between the card holder assembly 200 and the card slot 110 is utilized. When it is necessary to take the memory 600 out of the card holder assembly 200 or place the memory 600 on the card holder assembly 200, the first antenna module 300 can be switched from the first position to the second position, leaving the space between the card holder assembly 200 and the card slot 110, such that the card holder assembly 200 at least partially passes through the card slot 110 to extend out of the housing 100, thereby facilitating an operation of taking out/placing the memory 600 by a user.

It can be understood that the moving range of the first antenna module 300 includes two limit positions. In an embodiment, the first position is one limit position, and the second position is the other limit position. In another embodiment, the second position further includes a region between the two limit positions, as long as it is ensured that the card holder assembly 200 can extend out of the card slot 110 when the first antenna module 300 is located at the second position.

In an embodiment, when the first antenna module 300 is located at the first position, the first antenna module 300 is in operation; and when the first antenna module 300 is located at the second position, the first antenna module 300 is not in operation. It can be understood that when the mobile terminal 10 is a bar-type mobile terminal, if the first antenna module 300 is located at the first position, the first antenna module 300 is in operation. When it is necessary to take the memory 600 out of the card holder assembly 200 or place the memory 600 on the card holder assembly 200, the first antenna module 300 is switched from the first position to the second position, and the first antenna module 300 is not in operation.

In another embodiment, the first antenna module 300 is in an operating state regardless of the first position or the second position. It can be understood that when the mobile terminal 10 is a periscope mobile terminal or a slider mobile terminal, the first antenna module 300 may be arranged on a periscope mechanism or a slider mechanism of the mobile terminal 20.

In an embodiment, when the periscope mechanism or the slider mechanism is in an overlapped state, the first antenna module 300 is located at the first position, that is, the first antenna module 300 is located between the card holder assembly 200 and the card slot 110. In this case, the first antenna module 300 is in operation. When the periscope mechanism or the slider mechanism is in a sliding-out state, the first antenna module 300 is located at the second position, and the user can take the memory 600 out of the card holder assembly 200 or place the memory 600 on the card holder assembly 200. In this case, the first antenna module 300 is in operation.

In another embodiment, the mobile terminal assembly further includes a second antenna module (not shown) disposed on the housing 100. When the first antenna module 300 is located at one of the first position and the second position, the second antenna module is in operation. When the first antenna module 300 is located at the other one of the first position and the second position, the second antenna module is not in operation.

In an embodiment, the second antenna module has a use priority not greater than that of the first antenna module 300.

In an embodiment, the first antenna module 300 is a 5G antenna module. The second antenna module is a 5G antenna or another conventional antenna module.

In an embodiment, the first antenna module 300 is at least one of a millimeter wave antenna module, a sub 6 GHz antenna structure module, or the like.

In an embodiment, if the mobile terminal 10 is a periscope mobile terminal or a slider mobile terminal, when the first antenna module 300 moves between the first position and the second position, a position change of the first antenna module 300 may affect the antenna performance of the second antenna module. In this case, the use priority of the second antenna module is reduced to ensure that the second antenna module is in operation when the first antenna module 300 is located at one of the first position and the second position; and the second antenna module is not in operation when the first antenna module 300 is located at the other one of the first position and the second position.

In an embodiment, when the first antenna module 300 is located at the second position, there is a second antenna module between the first antenna module 300 and the housing 100. In order to prevent the first antenna module 300 and the second antenna module from interfering with each other during operation, one of the first antenna module 300 and the second antenna module is not in operation when the first antenna module 300 is located at the second position.

Referring to FIGS. 2 to 9, in an embodiment, the mobile terminal assembly further includes a transmission assembly 400. The transmission assembly 400 is connected with the first antenna module 300 and drives the first antenna module 300 to switch between the first position and the second position.

In an implementation, the transmission assembly 400 drives a transmission connection of the first antenna module 300 under the action of an external force. In an embodiment, referring to FIGS. 2 to 5, the transmission assembly 400 includes a button 410, a sliding rail 420 and a rolling bead 430. The button 410 is at least partially located outside the housing 100 to facilitate interaction with a user. The sliding rail 420 is connected with the button 410, and both the sliding rail 420 and the first antenna module 300 are abutted against the rolling bead 430. It can be understood that by pressing the button 410 to cause the button 410 to move in a second direction, the button 410 drives the rolling bead 430 to move by driving the sliding rail 420, so that the first antenna module 300 moves in a first direction. It should be noted that the first direction is the x direction in FIG. 1, that is, a length direction of the first antenna module 300. The second direction is the y direction in FIG. 1, that is, s width direction of the first antenna module 300.

Figure 3:
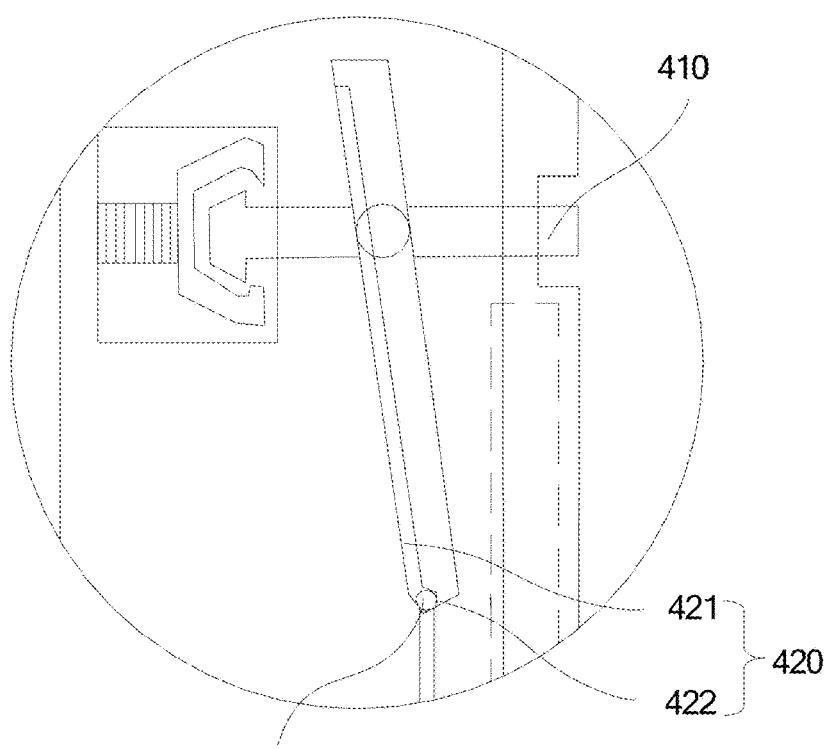
FIG. 3 is an enlarged view of A area in FIG. 2.
Figure 4:
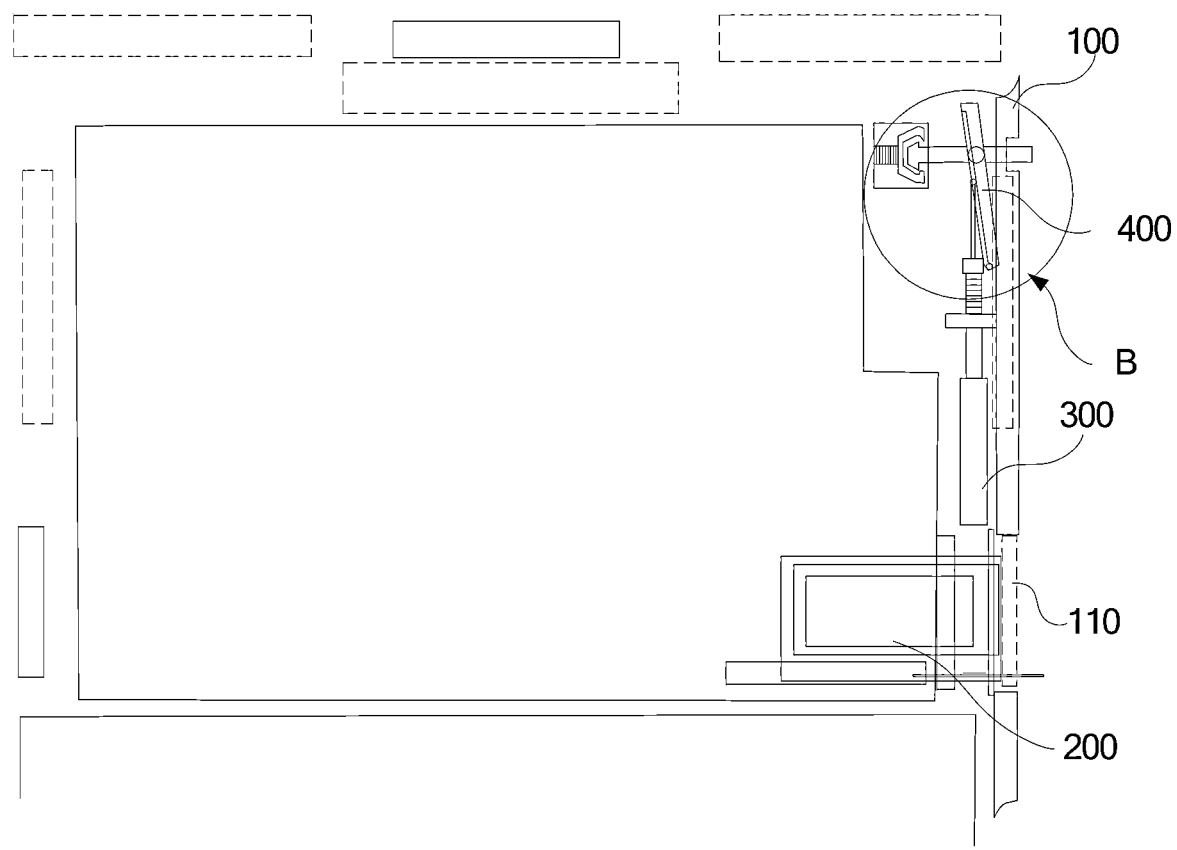
FIG. 4 is a schematic structural diagram of a mobile terminal assembly provided by an embodiment of the present disclosure, with a first antenna module being located at a second position.
Figure 5:
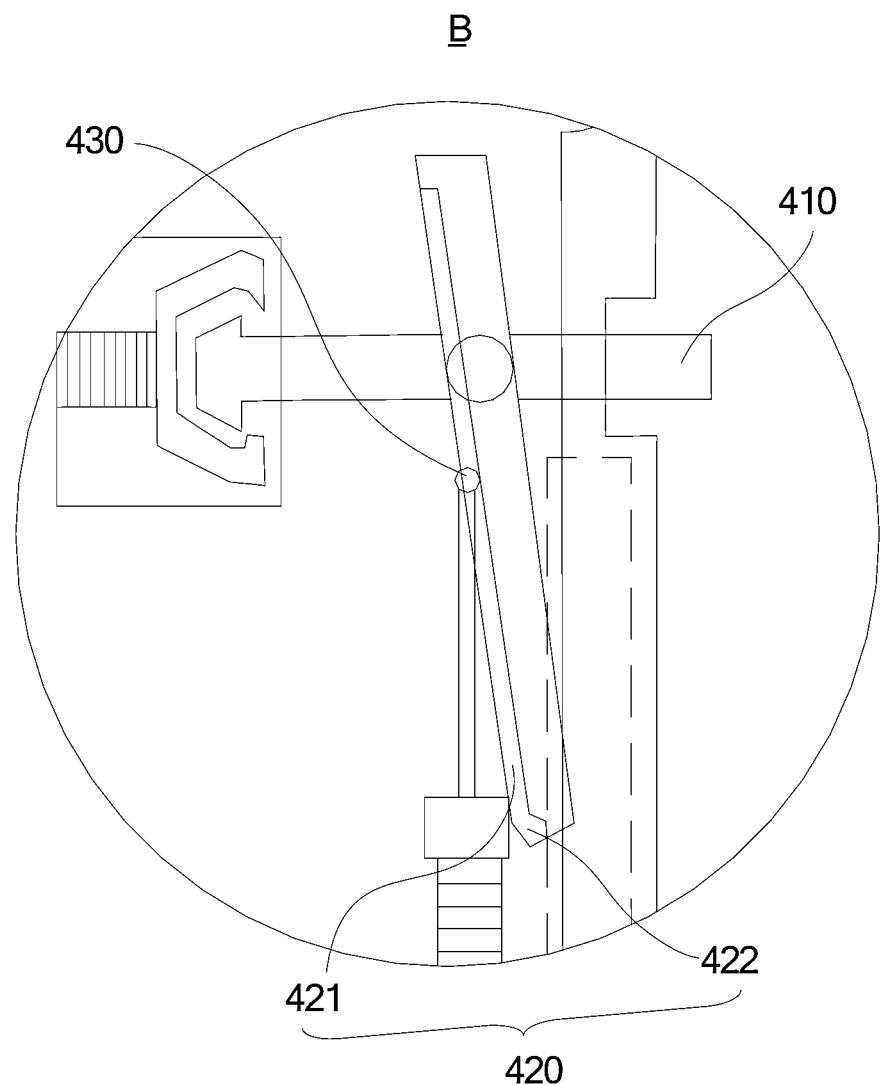
FIG. 5 is an enlarged view of B area in FIG. 4.

It can be understood that, referring to FIGS. 3 and 5, the sliding rail 420 is provided with a sliding groove 421 and a fixing groove 422. When the first antenna module 300 is located at the first position, the rolling bead 430 is located in the fixing groove 422. When the first antenna module 300 is located at the second position, the rolling bead 430 is located in the sliding groove 421. The sliding groove 421 has components in both the first direction and the second direction, so that the movement of the button 410 in the second direction is converted into the movement of the first antenna module 300 in the first direction. In an embodiment, the button 410 is of a self-locking structure. When the button 410 moves, the rolling bead 430 disengages from or enters the fixing groove 422, to assist the button 410 for a self-locking process.

In an implementation, referring to FIGS. 6 to 9, the transmission assembly 400 includes a first power source 440 and a first transmission device 450. The first power source 440 is fixed in the housing 100. The first transmission device 450 is connected with an output shaft of the first power source 440 and is in transmission connection with the first antenna module 300, such that the first transmission device 450 drives the first antenna module 300 to move between the first position and the second position in the first direction under the drive of the first power source 440.

Figure 6:
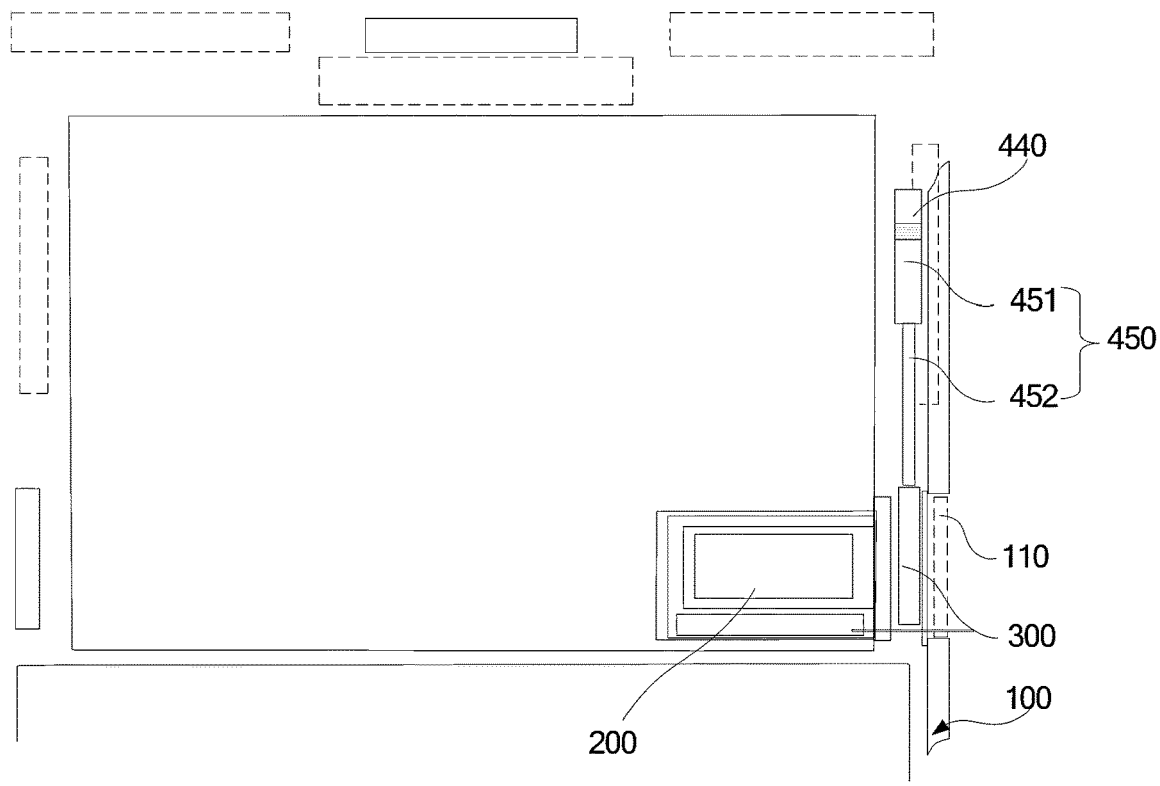
FIG. 6 is a schematic structural diagram of another mobile terminal assembly provided by an embodiment of the present disclosure, with the first antenna module being located at the first position.
Figure 7:
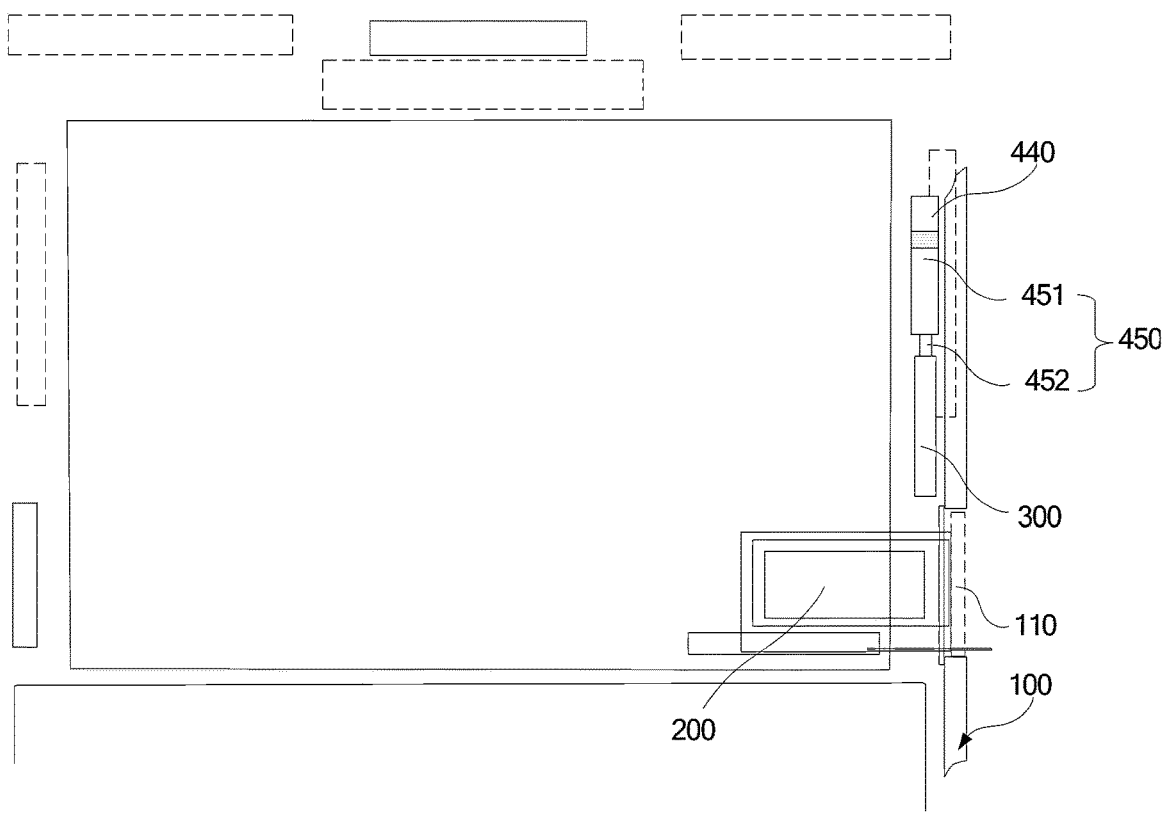
FIG. 7 is a schematic structural diagram of another mobile terminal assembly provided by an embodiment of the present disclosure, with the first antenna module being located at the second position.

In an embodiment, referring to FIGS. 6 and 7, the first transmission device 450 includes a transmission mechanism 451 and a connecting rod 452. The transmission mechanism 451 is in transmission connection with the output shaft of the first power source 440. Both the transmission mechanism 451 and the first antenna module 300 are connected with the connecting rod 452. It can be understood that the transmission mechanism 451 is a worm-gear structure, so as to convert the rotation of the output shaft of the first power source 440 into the movement of the connecting rod 452 in the first direction, thereby driving the first antenna module 300 to move between the first position and the second position in the first direction.

Figure 8:
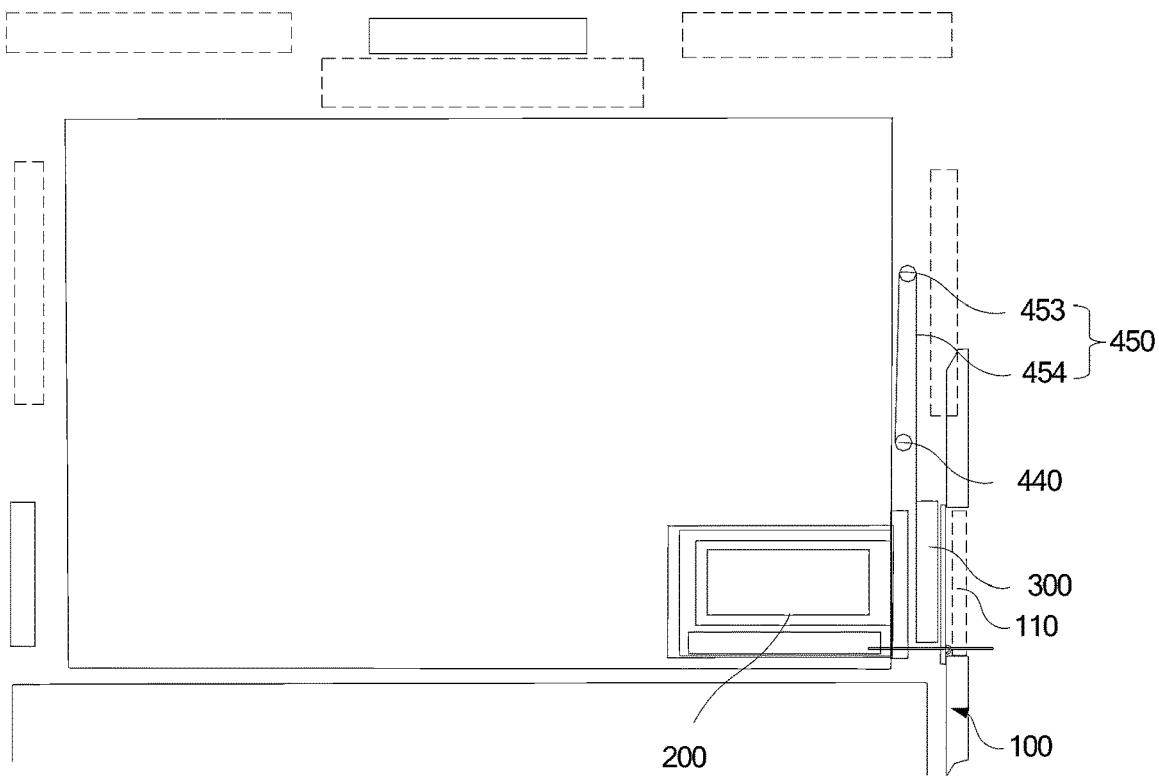
FIG. 8 is a schematic structural diagram of another mobile terminal assembly provided by an embodiment of the present disclosure, with the first antenna module being located at the first position.
Figure 9:
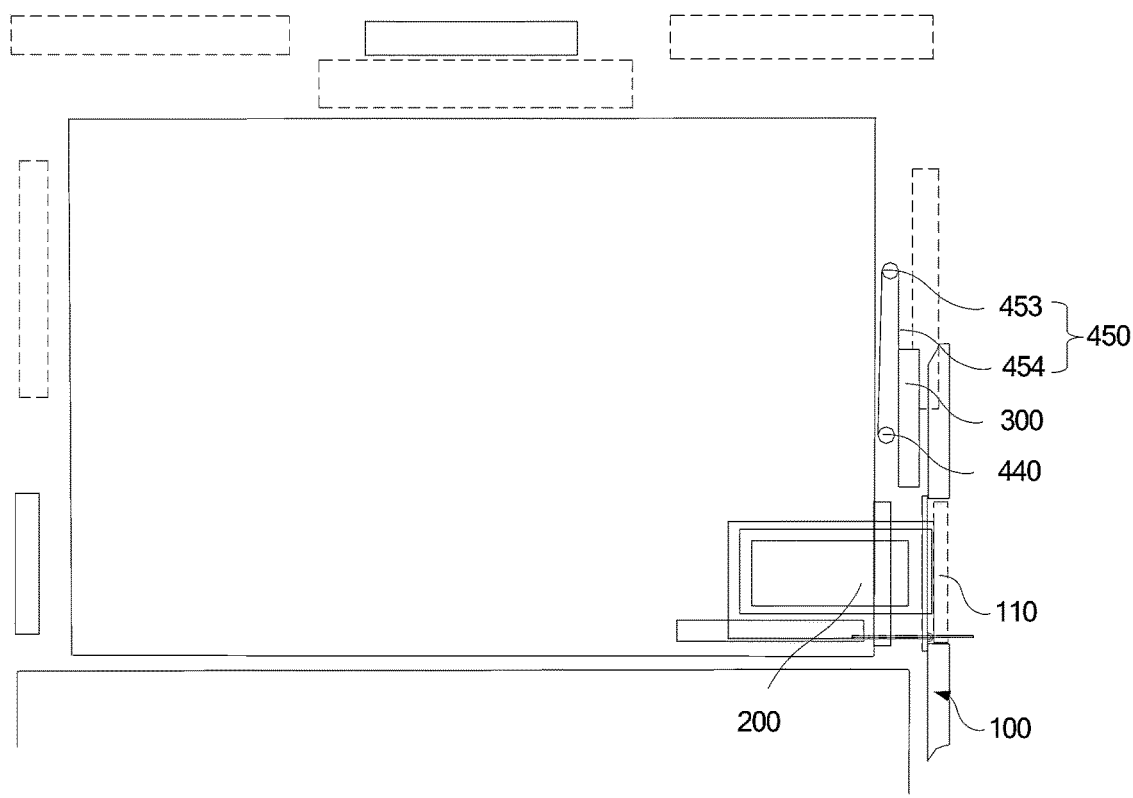
FIG. 9 is a schematic structural diagram of another mobile terminal assembly provided by an embodiment of the present disclosure, with the first antenna module being located at the second position.
Figure 10:
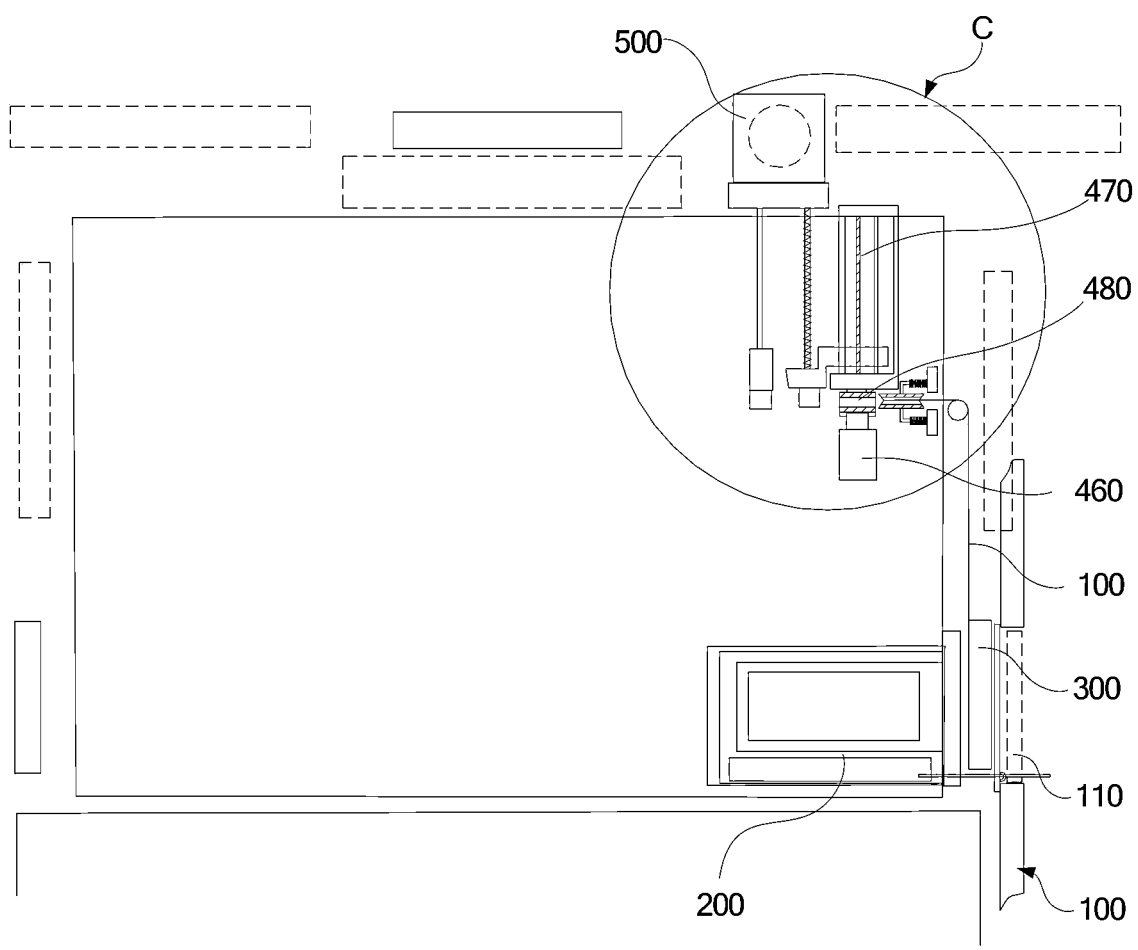
FIG. 10 is a schematic structural diagram of another mobile terminal assembly provided by an embodiment of the present disclosure, with the first antenna module being located at the first position.
Figure 11:
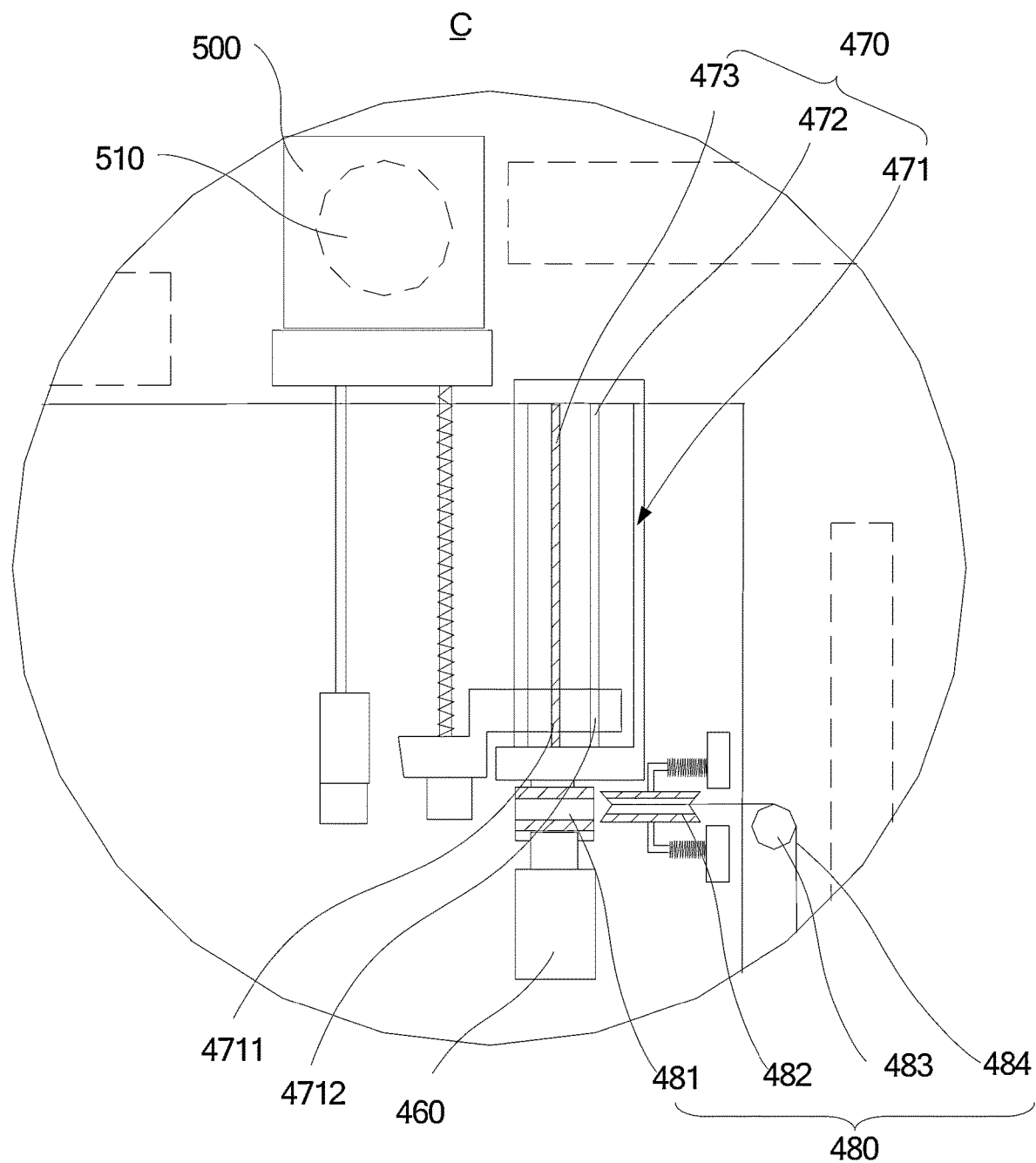
FIG. 11 is an enlarged view of C area in FIG. 10.

In an embodiment, referring to FIGS. 8, 10 and 11, the first transmission device 450 includes a first traction rope 454 and a first pulley 453. Both the output shaft of the first power source 440 and the first antenna module 300 are connected with the first traction rope 454. The first pulley 453 is fixed in the housing 100, and a rotation shaft of the first pulley 453 is parallel to the output shaft of the first power source 440. The first traction rope 454 is wound around a second pulley 483 to convert the rotation of the output shaft of the first power source 440 into the movement of the first antenna module 300 between the first position and the second position in the first direction.

It can be understood that when the transmission assembly 400 includes the first power source 440 and the first transmission device 450, the first power source 440 may be controlled by a mechanical button or by software installed in the mobile terminal 10, which is not limited in the present disclosure.

In an embodiment, when the first power source 440 is controlled by a mechanical button that is arranged at the card slot 110, the user triggers the mechanical button through an ejector pin 700, thereby preventing the mechanical button from affecting the appearance of the mobile terminal 10 as compared with the case when the mechanical button is arranged outside the housing 100, or even preventing the user from accidentally touching the mechanical button to affect the use experience.

Figure 15:
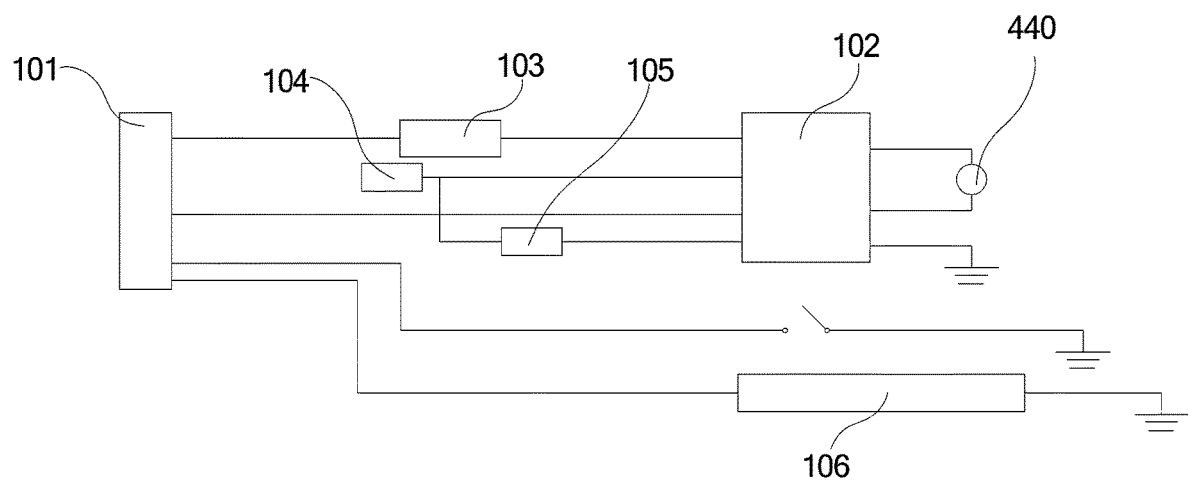
FIG. 15 is a schematic diagram of a control circuit of a first power source in FIG. 1.

In an implementation, referring to FIG. 15, the user generates a driving signal of the first power source 440 through interaction with the mechanical button. The driving signal of the first power source 440 is transmitted to a processor 101 through a third general purpose input & output (GPIO) of the processor 101. After receiving the driving signal, the processor 101 enables a driver 102 through a second input & output, and synchronously enables a Pulse Width Modulation (PWM) generator 103 through a first input & output to generate forward/reverse rotation control signals and transmit them to a first input of the driver 102. The driver 102 controls the forward/reverse rotation of the first power source 440 connected between a first output and a second output of the driver 102 according to the forward/reverse rotation control signals, thereby driving the first antenna module 300 to switch between the first position and the second position. A driving power supply 104 provides a reference voltage of the first power source 440 through a voltage division circuit 105 to the second input of the driver 102. It can be understood that in order to control the forward/reverse rotation of the first power source 440 more accurately, a photoelectric detection circuit 106 may be added to a main circuit board to provide auxiliary judgment for detecting an open/closing state of the card slot 110. When the first antenna module 300 is located at the second position, the card slot 110 is in an open state, and the photoelectric detection circuit 106 can be configured to detect light rays outside the housing 100. In this case, the user gives a driving signal to rotate the first power source 440 reversely to drive the first antenna module 300 to switch to the first position. When the first antenna module 300 is located at the first position, the card slot 110 is in the closed state, and any light rays outside the housing 100 cannot be detected by the photoelectric detection circuit 106. In this case, the user gives a driving signal to rotate the first power source 440 forward to drive the first antenna module 300 to switch to the second position.

Figure 16:
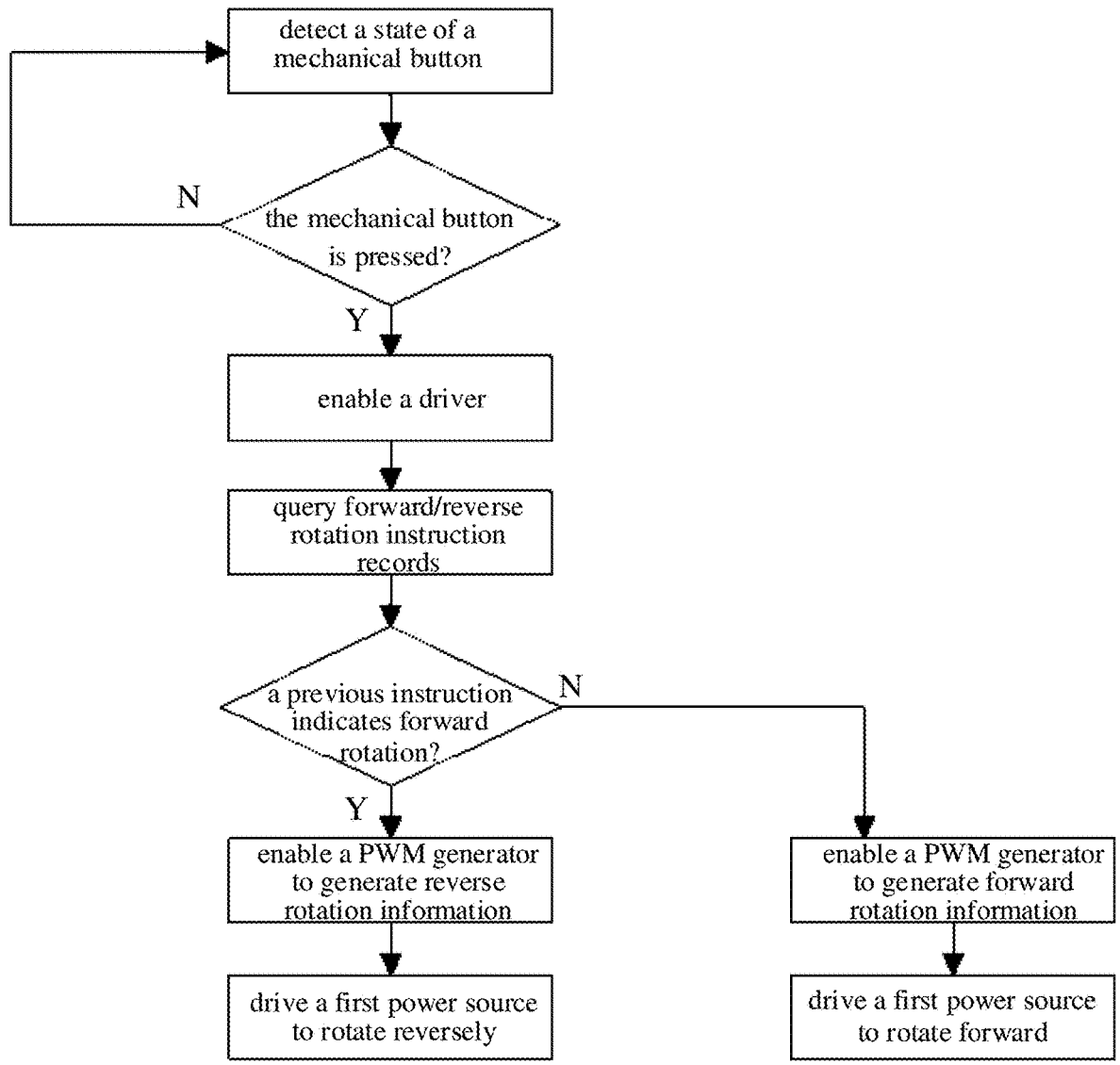
FIG. 16 is a flowchart of the control circuit in FIG. 15.

Referring to FIG. 16, in an implementation, a control method for forward/reverse rotation of the first power source 440 includes following steps.

The processor 101 is configured to detect whether the mechanical button is pressed. If it is not detected that the mechanical button is pressed, the processor 101 is configured to detect again whether the mechanical button is pressed.

It can be understood that in the above step, the user presses the mechanical button to give a driving signal, and the driving signal is transmitted to the processor 101 through the third general purpose input & output of the processor 101.

If it is detected that the mechanical button is pressed, the processor 101 is configured to enable the driver 102 to be powered on and ready for operation.

It can be understood that in the above step, the processor 101 is configured to enable the driver 102 through the second input & output after receiving the driving signal.

According to the recorded forward/reverse rotation instruction information, the processor 101 is configured to query whether the first power source 440 rotates forward at a previous moment.

If the first power source 440 rotates forward at the previous moment, the processor 101 is configured to enable the PWM generator 103 to generate reverse rotation information. The PWM generator 103 drives the first power source 440 to rotate reversely according to the reverse rotation information.

If the first power source 440 does not rotate forward at the previous moment, it means that the first power source 440 rotates reversely at the previous moment, and the processor 101 is configured to enable the PWM generator 103 to generate forward rotation information. The PWM generator 103 drives the first power source 440 to rotate forward according to the forward rotation information.

It can be understood that in the above step, the processor 101 is configured to synchronously enable the PWM generator 103 through the first input & output to generate forward/reverse rotation control signals and transmit them to a first input of the driver 102. In an embodiment, if the forward/reverse rotation instruction information indicates that the first power source 440 rotates forward at the previous moment, the processor 101 is configured to enable the PWM generator 103 to generate reverse rotation information. The PWM generator 103 drives the first power source 440 to rotate reversely according to the reverse rotation information.

After receiving the driving signal, the processor 101 is configured to enable the driver 102 through the second input & output, and enables the PWM generator 103 through the first input & output to generate forward/reverse rotation control signals and transmit them to the first input of the driver 102.

Figure 17:
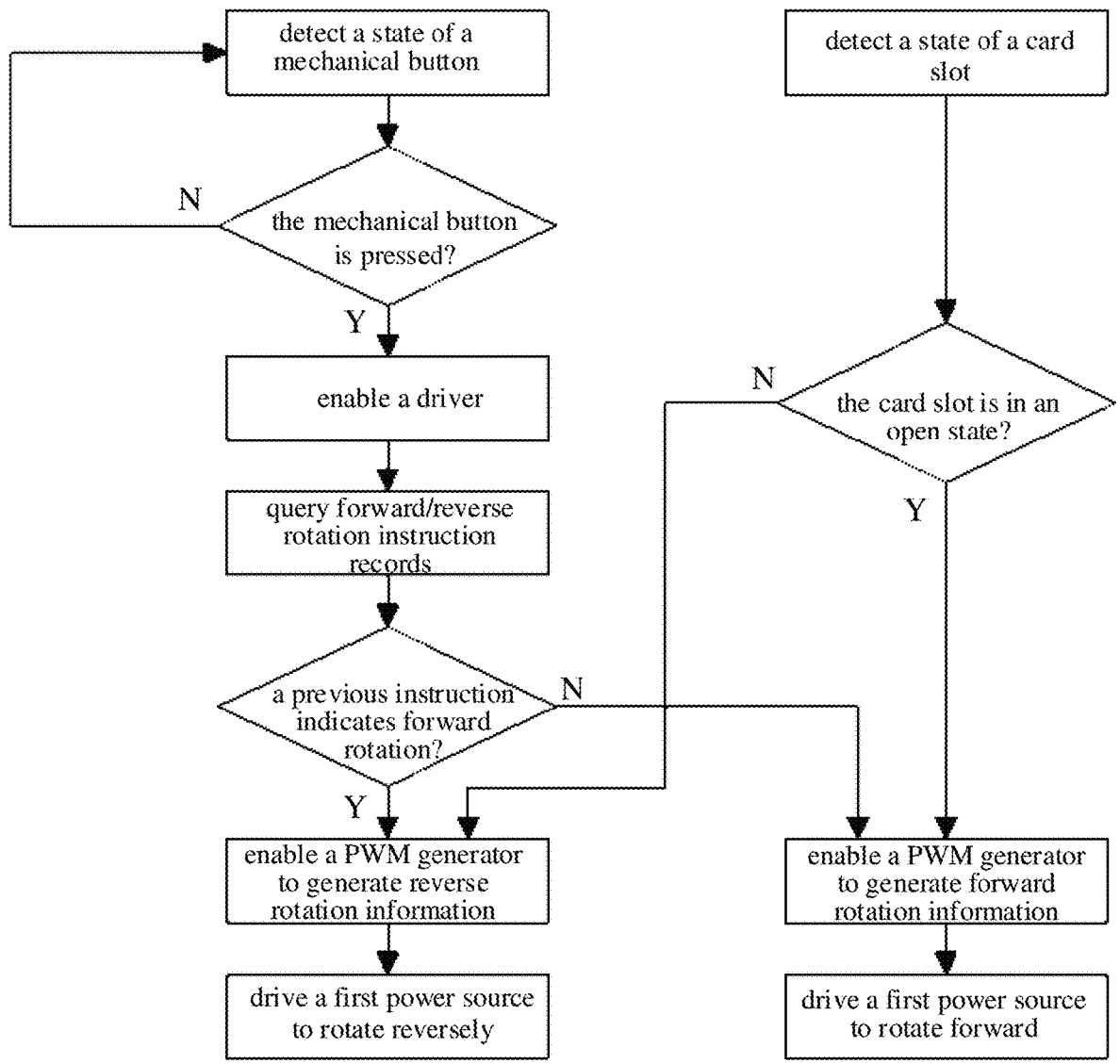
FIG. 17 is another flowchart of the control circuit in FIG. 15, with the control circuit including a photoelectric detection circuit.

Referring to FIG. 17, in an implementation, when the photoelectric detection circuit 106 is included in a control circuit of the first power source 440, the control method for forward/reverse rotation of the first power source 440 further includes following steps.

The photoelectric detection circuit 106 is configured to detect an open/closed state of the card slot 110.

If it is detected that the card slot 110 is in an open state and the first power source 440 does not rotate forward at a previous moment, it means that the first power source 440 rotates reversely at the previous moment, the processor 101 is configured to enable the PWM generator 103 to generate forward rotation information, and the PWM generator 103 drives the first power source 440 to rotate forward according to the forward rotation information.

If it is detected that the card slot 110 is in a closed state and the first power source 440 rotates forward at the previous moment, the processor 101 is configured to enable the PWM generator 103 to generate reverse rotation information, and the PWM generator 103 drives the first power source 440 to rotate reversely according to the reverse rotation information.

In an embodiment, referring to FIGS. 10 to 13, the mobile terminal assembly further includes a movable assembly 500 that is in transmission connection with the first antenna module 300 by the transmission assembly 400. In an embodiment, the movable assembly 500 is one of a periscope mechanism, or a slider mechanism.

In an implementation, referring to FIG. 11, the movable assembly 500 includes a structured light assembly 510, thus realizing a full-screen effect of a front side of the mobile terminal 10 and simultaneously realizing three-dimensional target recognition and three-dimensional image reconstruction. It can be understood that the periscope mechanism or the slider mechanism is normally hidden behind the full screen, and when necessary, the periscope mechanism or the slider mechanism rises above the screen, and then the structured light assembly 510 on the periscope mechanism or the slider mechanism is exposed. In a forward-facing layout, the structured light assembly 510 is suitable for face recognition or safe unlocking, and the like; while in a backward-facing layout, the structured light assembly 510 is suitable for photographing or illumination.

In an implementation, referring to FIGS. 10 to 13, the transmission assembly 400 includes a second power source 460 and a second transmission device 470. The second power source 460 is fixed in the housing 100. An output shaft of the second power source 460 is in transmission connection with the movable assembly 500 by the second transmission device 470. It can be understood that when the movable assembly 500 is a slider mechanism, the movable assembly 500 may also be directly driven to move by an external force, which is not limited in the embodiment of the present disclosure.

In an embodiment, referring to FIGS. 10 to 13, the second transmission device 470 includes a bracket 471, a threaded rod 472 and a support rod 473. The bracket 471 is connected with the movable assembly 500. The bracket 471 includes a first bearing 4711 with internal threads and a second bearing 4712. The threaded rod 472 extends through the first bearing 4711 and is connected with the output shaft of the second power source 460. The support rod 473 extends through the second bearing 4712 and is parallel to the threaded rod 472, such that the second power source 460 drives the movable assembly 500 to move in a length direction of the support rod 473. It can be understood that the threaded rod 472 is provided in the form of a ball screw. The second transmission device 470 further includes beads adapted to the threaded rod 472 to change sliding friction between the first bearing 4711 and the threaded rod 472 into rolling friction and improve the flexibility of the second transmission device 470.

In an implementation, referring to FIGS. 10 to 11, the transmission assembly 400 further includes a third transmission device 480. Both the output shaft of the second power source 460 and the first antenna module 300 are connected with the third transmission device 480. In an embodiment, referring to FIG. 11, the third transmission device 480 includes a driving wheel 481, a driven wheel 482, a second pulley 483 and a second traction rope 484. The driving wheel 481 is connected with the output shaft of the second power source 460. The driven wheel 482 is adapted to the driving wheel 481 and is provided with an accommodating groove. The second pulley 483 is fixed in the housing 100. A rotation shaft of the second pulley 483 is parallel to the output shaft of the second power source 460. The second traction rope 484 is at least partially located in the accommodating groove, and is connected with the whole first antenna module 300. The second traction rope 484 is wound around the second pulley 483 to convert rotation of the output shaft of the second power source 460 into the movement of the first antenna module 300 between the first position and the second position in the first direction.

In an embodiment, referring to FIG. 11, the third transmission device 480 further includes an electromagnet, and the driven wheel 482 includes a magnetic attraction member and an elastic member. When the electromagnet is in a power-off state, the driven wheel 482 is disengaged from the driving wheel 481 under the action of the elastic member, and the first antenna module 300 is located at the first position. When the electromagnet is in a power-on state, the driven wheel 482 is engaged with the driving wheel 481 under the action of the electromagnet and the magnetic attraction member, and the first antenna module 300 is driven by the third transmission device 480 to move from the first position to the second position.

Figure 12:
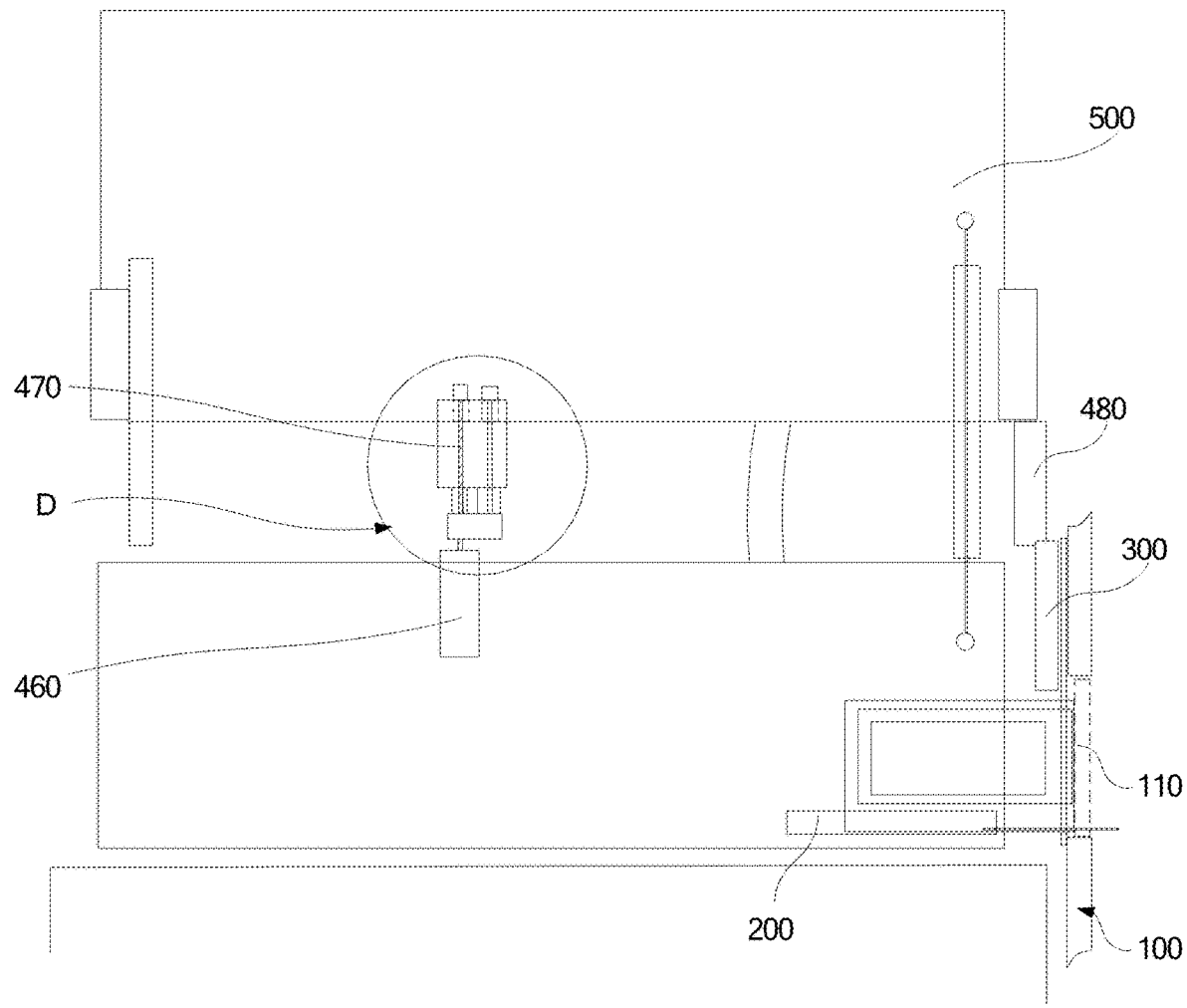
FIG. 12 is a schematic structural diagram of another mobile terminal assembly provided by an embodiment of the present disclosure, with the first antenna module being located at the second position.
Figure 13:
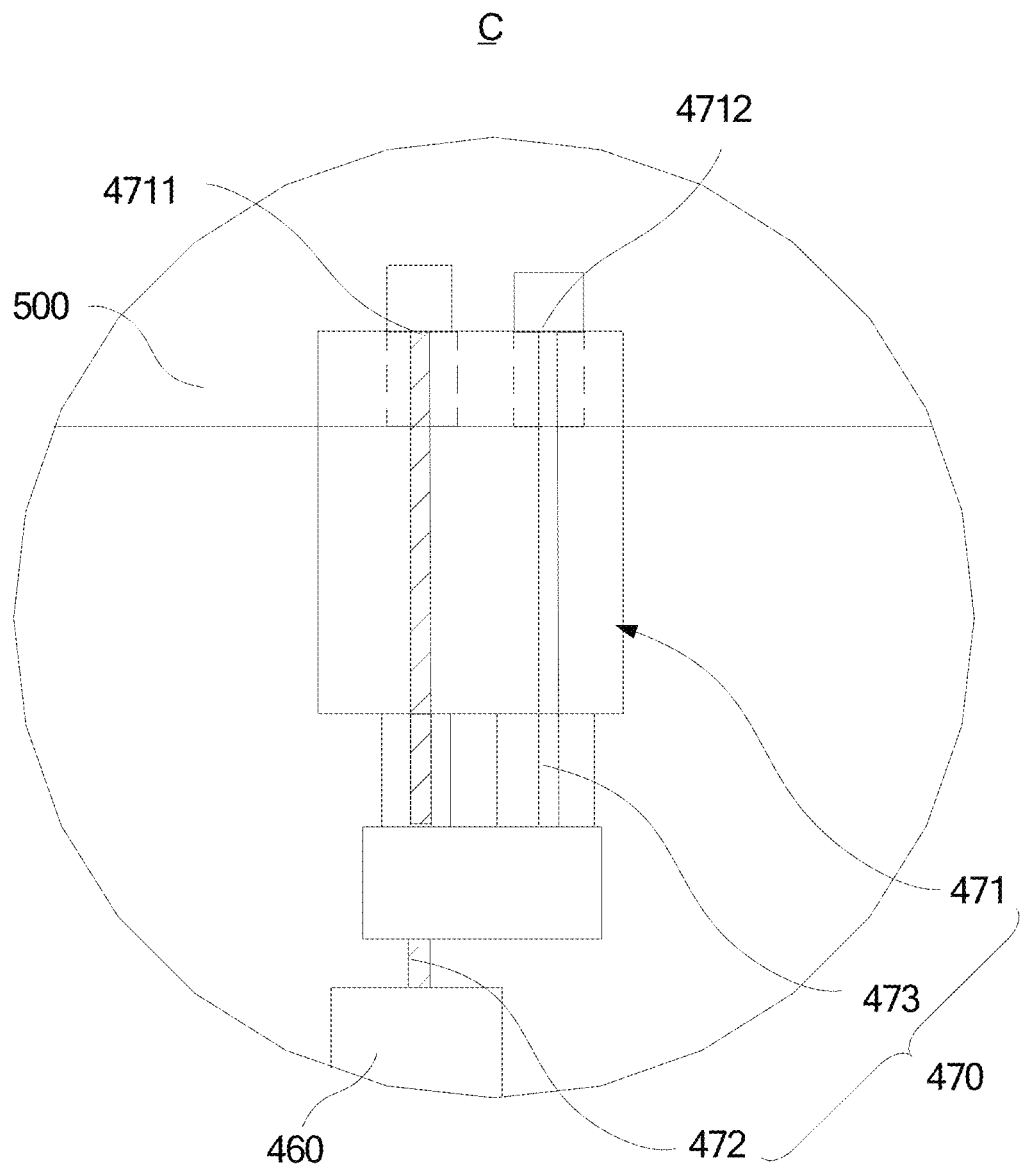
FIG. 13 is an enlarged view of D area in FIG. 12.

In an implementation, referring to FIG. 12, the transmission assembly 400 further includes a third transmission device 480. The third transmission device 480 includes a connecting mechanism 485 by which the first antenna module 300 is connected with the movable assembly 500, such that the movable assembly 500 drives the first antenna module 300 to move.

It can be understood that the control circuit and method of the second power source 460 are identical with those of the first power source 440, which will not be repeated in the present disclosure.

In an embodiment, the mobile terminal assembly is provided with a heat dissipation member that is fixed in the housing 100 and is abutted against the first antenna module 300. Additionally or alternatively, the heat dissipation member is connected with the first antenna module 300. It can be understood that the heat dissipation member is made of ceramic material to reduce the electromagnetic interference of the heat dissipation member to the first antenna module 300. Thermally conductive silicone grease may be filled between the heat dissipation member and the first antenna module 300 to prevent collision damage between the heat dissipation member and the first antenna module 300. In an embodiment, both ends of the heat dissipation member are provided with auxiliary heat dissipation portions, which dissipate heat by contacting with a large-area metal sheet far away from the first antenna module 300.

Figure 14:
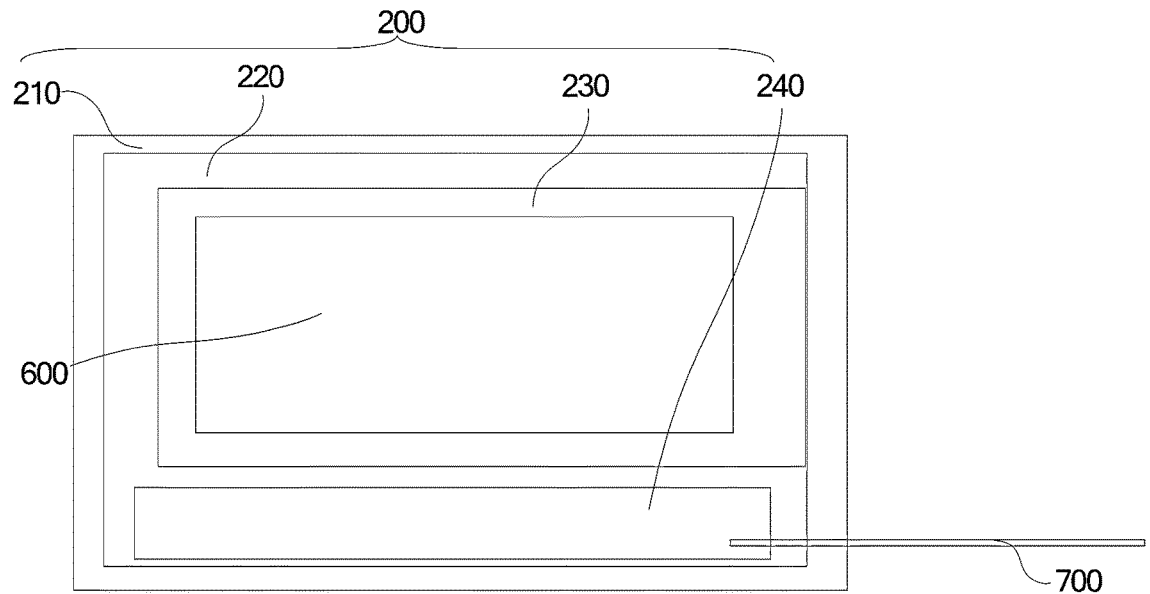
FIG. 14 is a schematic structural diagram of a card holder assembly in FIG. 1.

In an embodiment, referring to FIG. 14, the card holder assembly 200 includes a card holder 210 and a first card support 220. The card holder 210 is fixed in the mobile terminal 10. The first card support 220 is connected with the card holder 210, and is slidable relative to the card holder 210 and can extend out of the housing 100 through the card slot 110. It can be understood that the card holder assembly 200 further includes a self-locking mechanism 240 that can be driven by utilizing the ejector pin 700 to move the first card support 220. At present, the commonly used self-locking mechanism 240 of the card holder assembly 200 is of a push-push structure, which is one of the mechanical self-locking structures.

In an embodiment, referring to FIG. 14, the card holder assembly 200 further includes a second card support 230 that is connected with the first card support 220 and is slidable relative to the first card support 220. In the process that the first card support 220 drives the memory 600 to extend out of the housing 100 from inside the housing 100, the second card support 230 and the first card support 220 extend out in sequence.

It can be understood that since the first position is set between the card holder assembly 200 and the card slot 110, a distance between the card holder 210 and the card slot 110 is increased. In this case, when a user takes out/places the memory 600, a stroke of jacking the push-push mechanical self-locking mechanism 240 by means of the ejector pin 700 from outside the card slot 110 is greatly increased (the 5G antenna module usually has a thickness of 0.6 mm to 1.8 mm, a width of 3.5 mm to 5 mm, and a slight inclination in a direction perpendicular to the screen; in this way, the distance between the card holder 210 and the card slot 110 is further increased), thereby causing that the ejection distance of the first card support 220 is insufficient to take out/place the memory 600. In this case, the card holder assembly 200 is additionally provided with a second card support 230, and the self-locking mechanism 240 is added with an intermediate mechanical self-locking, that is, a dual-transient mechanical self-locking structure, to realize nesting of the first card support 220 and the second card support 230. That is, the ejector pin 700 jacks the self-locking mechanism 240 of the card holder assembly 200 for the first time to eject the first card support 220 (a first transient state), and then the ejector pin 700 is pressed for the second time to eject the second card support 230 (a second transient state), thereby allowing the user to take out/place the memory 600.

In accordance with another aspect of the present disclosure, an embodiment provides a mobile terminal 10 that includes the mobile terminal assembly as described above.

In the mobile terminal assembly provided by the embodiment of the present disclosure, the first antenna module is designed to be able to switch between the first position and the second position, so that the internal space of the mobile terminal can be fully utilized. When the first antenna module is located at the first position, the card holder assembly is located in the housing, and the first antenna module is located between the card holder assembly and the card slot, so the space infrequently used between the card holder assembly and the card slot is utilized. When it is necessary to take the memory out of the card holder assembly or place the memory on the card holder assembly, the first antenna module can be switched from the first position to the second position, leaving the space between the card holder assembly and the card slot, so that the card holder assembly can at least partially pass through the card slot to extend out of the housing, thereby facilitating an operation of taking out/placing the memory by a user.

In the description of the present disclosure, it should be noted that, unless otherwise expressly specified and defined, terms such as "installed", "connected" and "connecting" shall be understood in broad sense, and for example, may refer to fixed connection or detachable connection or integral connection, mechanical connection or electrical connection, direct connection or indirect connection through an intermediate medium, inner communication of two elements or interaction between two elements. For those having ordinary skills in the art, the specific meanings of the above terms in the present disclosure may be understood according to specific situations.

In the present disclosure, unless otherwise specified and defined, that the first feature is "above" or "below" the second feature may mean that there is direct contact between the first and second features, or contact between the first and second features through other features rather than direct contact. Furthermore, the first feature is "over", "above" or "on" the second feature may mean that the first feature is directly above and obliquely above the second feature, or may only indicate that a horizontal height of the first feature is greater than that of the second feature. The first feature is "beneath", "below" and "under" the second feature may mean that the first feature is directly below and obliquely below the second feature, or may only indicate that the horizontal height of the first feature is less than that of the second feature.

The above disclosure provides many different implementations or examples to realize different structures of the present disclosure. In order to simplify the present disclosure, the components and settings of specific examples are described above. These are examples only, of course, and are not intended to limit the present disclosure. In addition, in the present disclosure, reference numerals and/or reference letters may be repeated in different examples. This repetition is for the purpose of simplification and clarity, and does not indicate the relationship between the various implementations and/or settings discussed. In addition, the present disclosure provides examples of various specific processes and materials. However, those having ordinary skills in the art may recognize the application of other processes and/or the use of other materials.

In the description, description with reference to the terms "one implementation", "some implementations", "illustrative implementations", "examples", "specific examples" or "some examples" means that the specific features, structures, materials or characteristics described in conjunction with that embodiments or examples are included in at least one implementation or example of the present disclosure. In this description, the schematic expressions of the above terms do not necessarily refer to the same implementations or examples. Furthermore, the specific features, structures, materials or characteristics described may be combined in any one or more implementations or examples in a suitable manner.

Although the embodiments of the present disclosure have been shown and described, those having ordinary skills in the art may understand that many changes, modifications, replacements and variations can be made to these implementations without departing from the principles and purposes of the present disclosure, and the scope of present disclosure is defined by the claims and their equivalents.

What is claimed is:

1. A mobile terminal assembly applied to a mobile terminal, comprising:
   a housing with a card slot;
   a card holder assembly located at the card slot and configured for insertion of a memory; and
   a first antenna module arranged in the housing;
   wherein the first antenna module is configured to be switched between a first position and a second position under the action of an external force; in response to the first antenna module being located at the first position, the card holder assembly is located in the housing, and the first antenna module is located between the card holder assembly and the card slot; and in response to the first antenna module being located at the second position, the card holder assembly at least partially passes through the card slot to extend outside the housing.

2. The mobile terminal assembly of claim 1, further comprising a transmission assembly which is connected with the first antenna module and configured to drive the first antenna module to switch between the first position and the second position.

3. The mobile terminal assembly of claim 2, wherein the transmission assembly is configured to drive the first antenna module to be in transmission connection under the action of an external force.

4. The mobile terminal assembly of claim 3, wherein the transmission assembly comprises:
 a button at least partially located outside the housing;
 a sliding rail connected with the button; and
 a rolling bead against which both the sliding rail and the first antenna module are abutted;
 wherein the sliding rail is provided with a sliding groove and a fixing groove; in response to the first antenna module being located at the first position, the rolling bead is located in the fixing groove; and in response to the first antenna module being located at the second position, the rolling bead is located in the sliding groove.

5. The mobile terminal assembly of claim 2, wherein the transmission assembly comprises:
 a first power source fixed in the housing; and
 a first transmission device which is connected with an output shaft of the first power source and is in transmission connection with the first antenna module, such that the first transmission device is configured to drives the first antenna module to move between the first position and the second position in a first direction in response to the first power source driving the first transmission device.

6. The mobile terminal assembly of claim 5, wherein the first transmission device comprises:
 a transmission mechanism in transmission connection with the output shaft of the first power source;
 a connecting rod connected with the transmission mechanism and the first antenna module respectively.

7. The mobile terminal assembly of claim 5, wherein the first transmission device comprises:
 a first traction rope connected with the output shaft of the first power source and the first antenna module respectively; and
 a first pulley fixed in the housing,
 wherein a rotation shaft of the first pulley is parallel to the output shaft of the first power source; and
 wherein the first traction rope is wound around a second pulley to convert rotation of the output shaft of the first power source into movement of the first antenna module in the first direction.

8. The mobile terminal assembly of claim 2, further comprising a movable assembly which is in transmission connection with the first antenna module by the transmission assembly.

9. The mobile terminal assembly of claim 8, wherein the transmission assembly comprises a second power source and a second transmission device both of which are fixed in the housing, an output shaft of the second power source being in transmission connection with the movable assembly by the second transmission device;
 wherein the second transmission device comprises:
 a bracket connected with the movable assembly, the bracket including a first bearing with internal threads and a second bearing;
 a threaded rod extending into the first bearing, the threaded rod being connected with the output shaft of the second power source; and
 a support rod extending into the second bearing, the support rod being parallel to the threaded rod, such that the second power source drives the movable assembly to move in a length direction of the support rod.

10. The mobile terminal assembly of claim 9, wherein the transmission assembly comprises a third transmission device connected with the output shaft of the second power source and the first antenna module respectively;
 wherein the third transmission device comprises:
 a driving wheel connected with the output shaft of the second power source;
 a driven wheel adapted to the driving wheel and provided with an accommodating groove;
 a second pulley fixed in the housing, a rotation shaft of the second pulley being parallel to the output shaft of the second power source; and
 a second traction rope at least partially located in the accommodating groove, wherein the first antenna module is connected with the second traction rope; and the second traction rope is wound around the second pulley to convert rotation of the output shaft of the second power source into movement of the first antenna module in the first direction.

11. The mobile terminal assembly of claim 9, wherein the transmission assembly comprises a third transmission device comprising a connecting mechanism, and the first antenna module being connected with the movable assembly by the connecting mechanism, such that the movable assembly drives the first antenna module to move.

12. The mobile terminal assembly of claim 1, wherein in response to the first antenna module being located at the first position, the first antenna module is in operation; and in response to the first antenna module being located at the second position, the first antenna module is not in operation.

13. The mobile terminal assembly of claim 1, wherein the memory comprises at least one of an SIM card, an SD card, or an SIM/SD combination card.

14. The mobile terminal assembly of claim 1, wherein the card holder assembly comprises:
 a card holder; and
 a first card support connected with the card holder and slidable relative to the card holder to extend outside the housing through the card slot.

15. The mobile terminal assembly of claim 14, wherein the card holder assembly comprises:
 a second card support connected with the first card support and slidable relative to the first card support;
 wherein, in a process in which the first card support drives the memory to extend from inside to outside the housing, the second card support and the first card support extend out in sequence.

16. The mobile terminal assembly of claim 1, wherein in response to the first antenna module being located at the first position or the second position, the first antenna module is in operation.

17. The mobile terminal assembly of claim 1, wherein the mobile terminal assembly comprises a second antenna module arranged on the housing; and
 wherein in response to the first antenna module being located at one of the first position and the second position, the second antenna module is in operation;

and in response to the first antenna module being located at the other one of the first position and the second position, the second antenna module is not in operation.

18. A mobile terminal, comprising a mobile terminal assembly comprising:
   a housing with a card slot;
   a card holder assembly located at the card slot and configured for insertion of a memory; and
   a first antenna module arranged in the housing;
   wherein the first antenna module is configured to be switched between a first position and a second position under the action of an external force; in response to the first antenna module being located at the first position, the card holder assembly is located in the housing, and the first antenna module is located between the card holder assembly and the card slot and in response to the first antenna module being located at the second position, the card holder assembly at least partially passes through the card slot to extend outside the housing.

19. The mobile terminal of claim 18, wherein the mobile terminal assembly further comprises a transmission assembly which is connected with the first antenna module and configured to drive the first antenna module to switch between the first position and the second position.

20. The mobile terminal of claim 18, wherein the card holder assembly comprises:
   a card holder; and
   a first card support connected with the card holder and slidable relative to the card holder to extend outside the housing through the card slot.

* * * * *